US012660942B2

(12) United States Patent
Fouinat et al.

(10) Patent No.: US 12,660,942 B2
(45) Date of Patent: Jun. 23, 2026

(54) ELEMENT FOR COVERING A SEAT SUPPORT ELEMENT

(71) Applicant: Faurecia Sièges d'Automobile, Nanterre (FR)

(72) Inventors: Didier Fouinat, Saint-Cheron (FR); Julie Thomas, Les Aynans (FR); Christophe Remy, Fougerolles (FR); Fabrice Etienne, Bavilliers (FR)

(73) Assignee: FAURECIA SIÈGES D'AUTOMOBILE, Nanterre (FR)

( * ) Notice: Subject to any disclaimer, the term of this patent is extended or adjusted under 35 U.S.C. 154(b) by 141 days.

(21) Appl. No.: 18/697,237

(22) PCT Filed: Sep. 29, 2022

(86) PCT No.: PCT/EP2022/077182
§ 371 (c)(1),
(2) Date: Mar. 29, 2024

(87) PCT Pub. No.: WO2023/052539
PCT Pub. Date: Apr. 6, 2023

(65) Prior Publication Data
US 2024/0398132 A1      Dec. 5, 2024

(30) Foreign Application Priority Data

Sep. 30, 2021 (FR) ...................................... 2110344

(51) Int. Cl.
*A47C 31/02* (2006.01)
*B60N 2/58* (2006.01)

(52) U.S. Cl.
CPC .......... *A47C 31/023* (2013.01); *B60N 2/5825* (2013.01); *B60N 2/5891* (2013.01)

(58) Field of Classification Search
CPC .. A47C 31/023; B60N 2/5825; B60N 2/5891; B60N 2/6027
See application file for complete search history.

(56) References Cited

U.S. PATENT DOCUMENTS

| | | | |
|---|---|---|---|
| 2018/0229635 A1* | 8/2018 | Sahashi | B60N 2/7035 |
| 2020/0156519 A1 | 5/2020 | Yu | |
| 2021/0300221 A1* | 9/2021 | Cabouillet | B29C 44/08 |
| 2023/0056871 A1* | 2/2023 | Fouinat | B32B 7/08 |
| 2024/0391370 A1* | 11/2024 | Fouinat | B60N 2/6009 |

OTHER PUBLICATIONS

International Search Report with translation for PCT/EP2022/077182, dated Jan. 5, 2023, 7 pages.
French Search Report corresponding to application No. FR 2110344, dated May 16, 2022, 2 pages.
International Written Opinion for PCT/EP2022/077182, dated Jan. 5, 2023, 4 pages.

* cited by examiner

*Primary Examiner* — Rodney A Bonnette
(74) *Attorney, Agent, or Firm* — Reising Ethington P.C.

(57) ABSTRACT

A covering element intended to be fastened to a frame and having an inner surface and an outer surface. The covering element includes, from the inner surface to the outer surface, at least one foam layer, a skin made of synthetic material, and a paint layer. The covering element further includes at least one fastening element for fastening the covering element to the frame, the fastening element having at least one reinforcing portion that extends into the foam layer and is overmolded by the foam layer and at least one fastening portion that projects out of the inner surface of the foam layer.

11 Claims, 5 Drawing Sheets

ELEMENT FOR COVERING A SEAT SUPPORT ELEMENT

TECHNICAL FIELD

The present invention relates to an element for covering a seat support element of the type intended to be fastened to a frame of the support element, the covering element comprising an inner surface intended to be turned toward said frame and an outer surface, opposite the inner surface and intended to be facing outward from the support element, the covering element comprising, from the inner surface to the outer surface, at least one foam layer, a skin made of synthetic material and a paint layer.

The invention also relates to a seat support element comprising such a covering element and a method for producing such a covering element.

BACKGROUND

The invention applies for example to the covering of a support element forming the squab or backrest of a vehicle seat. Such a support element must therefore have a comfort and an appearance that are satisfactory for the accommodation of passengers in the vehicle.

To do this, the support element is formed of a padding and a covering element assembled on a frame of the support element, the covering element forming an exterior surface of the support element, for example the rear face of a seat when the support element is a seat backrest. The covering element thus gives the support element its appearance.

In order to facilitate the assembly of the support element and give it a satisfactory appearance, the covering element must be able to be fastened to the frame simply and quickly, while ensuring precise positioning of the support element on the frame.

To do this, elements for fastening the covering element to the frame are generally fastened to the covering element, for example by gluing or clipping. However, such a step of fastening elements makes the method of producing the covering element more difficult and lengthy to implement and requires a certain number of workstations to perform the various steps of manufacturing the covering element. In addition, it may be difficult to correctly position the fastening elements onto the covering element, which may subsequently lead to difficulties in mounting the covering element onto the frame.

SUMMARY

One of the aims of the invention is to overcome this drawback by proposing a covering element comprising an element for fastening the covering element to a frame that is simple and quick to carry out reliably and at a reduced number of workstations.

To this end, the invention relates to a covering element of the aforementioned type, further comprising at least one fastening element for fastening the covering element to the frame, said fastening element comprising at least one reinforcing portion extending into the foam layer and overmolded by said foam layer and at least one fastening portion that projects out of the inner surface of said foam layer.

Thus, the covering element has satisfactory properties and directly incorporates a fastening element in the foam layer, this integration being able achievable at the time of the production of the foam layer in a single tool for producing the covering element. Furthermore, the overmolding of the fastening element makes it possible to ensure precise positioning of the fastening element in the covering element. The fastening element according to the invention also offers a function of reinforcing the covering element in order for example to rigidify the parts of the covering element to be fastened to the frame, which facilitates the mounting of the covering element on the frame.

The covering element according to the invention may further comprise one or more of the following features, taken alone or in any technically feasible combination:

the fastening element is made from a single piece, the fastening portion that projects out of the reinforcing portion and comprising at least one fastening hook extending at a free end of said fastening portion and outside the foam layer, the foam layer comprises a main portion bounded by a lower edge and an upper edge and by two lateral edges joining the lower edge and the upper edge, at least one fastening element extending in the vicinity of one of the lower, upper or lateral edges, the reinforcing portion stiffening a part of said edge and the fastening portion being arranged to fasten said edge to a frame of a seat support element, the covering element comprises a plurality of fastening elements each extending in the vicinity of a different edge of the foam layer, each lateral edge of the foam layer extends in a direction different from the main portion, a lateral fastening element extending in the vicinity of one of the lateral edges comprising a first reinforcing portion extending into the main portion of the foam layer and a second reinforcing portion extending from the first reinforcing portion into the lateral edge of the foam layer, the fastening portion of the lateral fastening element projecting out from the first reinforcing portion a lower fastening element extending in the vicinity of the lower edge comprises a first reinforcing portion extending along a portion of the lower edge substantially parallel to said lower edge and two second reinforcing portions extending on either side of the first reinforcing portion substantially perpendicular to said first reinforcing portion, a fastening portion projecting out from each second reinforcing portion, an upper fastening element extending in the vicinity of the upper edge comprises a reinforcing portion extending along a portion of said upper edge and a plurality of fastening portions projecting out from said reinforcing portion, and the reinforcing portion of the fastening element comprises at least one opening passing through said reinforcing portion, the foam of the foam layer extending into said opening and on either side of said reinforcing portion.

According to another aspect, the invention also relates to a seat support element comprising a frame, comprising a lower cross member and an upper cross-member fastened to each other by two lateral uprights, and a covering element as described above, said covering element being fastened to at least one of the lower and upper cross members and/or to at least one of the lateral uprights by the fastening portion of at least one fastening element.

According to another aspect, the invention relates to a method for producing a covering element as described above, comprising the following steps:

applying at least one paint layer against a first surface of a molding cavity of a production tool, said first surface having the shape of the outer surface of the covering element to be made, applying a skin made of synthetic material against the inner surface of the paint layer, forming a molding cavity between the first surface and a second surface of the molding cavity, said second surface having the shape of the inner surface of the covering element to be made, at least one fastening element being placed in the production tool so that the reinforcing portion of said fastening element extends into the molding cavity and the fastening portion of said fastening element extends outside said molding cavity, injecting a foam precursor material into said molding cavity so as to form a foam layer on the inner surface of the skin made of synthetic material, said foam layer overmolding the reinforcing portion of the fastening element.

According to an optional feature of the method of production according to the invention, the skin made of synthetic material is made of a synthetic material devoid of water and the foam precursor material has a formulation containing water and a foaming catalyst at the time of its injection into the molding cavity.

BRIEF DESCRIPTION OF THE DRAWINGS

Other aspects and advantages of the invention will become apparent from reading the following description, which is provided by way of example and with reference to the appended drawings, wherein.

DETAILED DESCRIPTION

Figure 1:
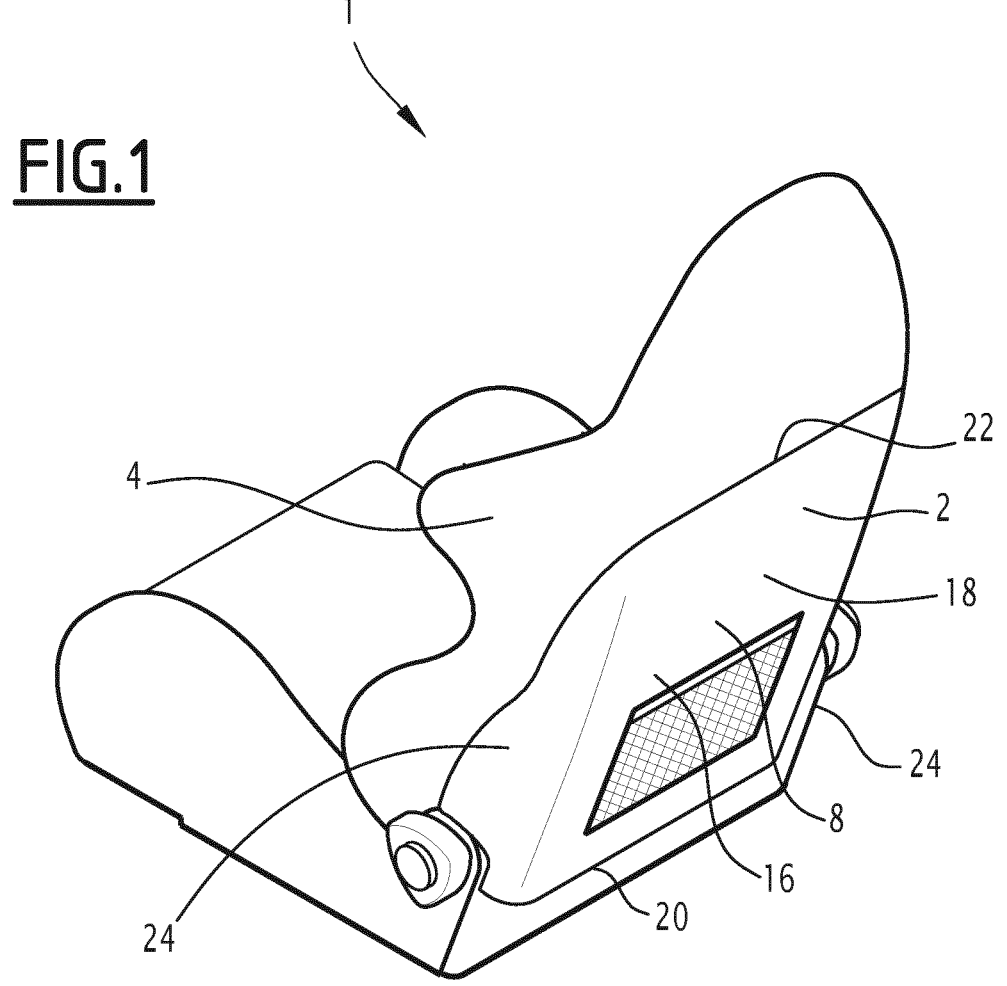
FIG. 1 is a schematic perspective view of a seat support element comprising a covering element.
Figure 2:
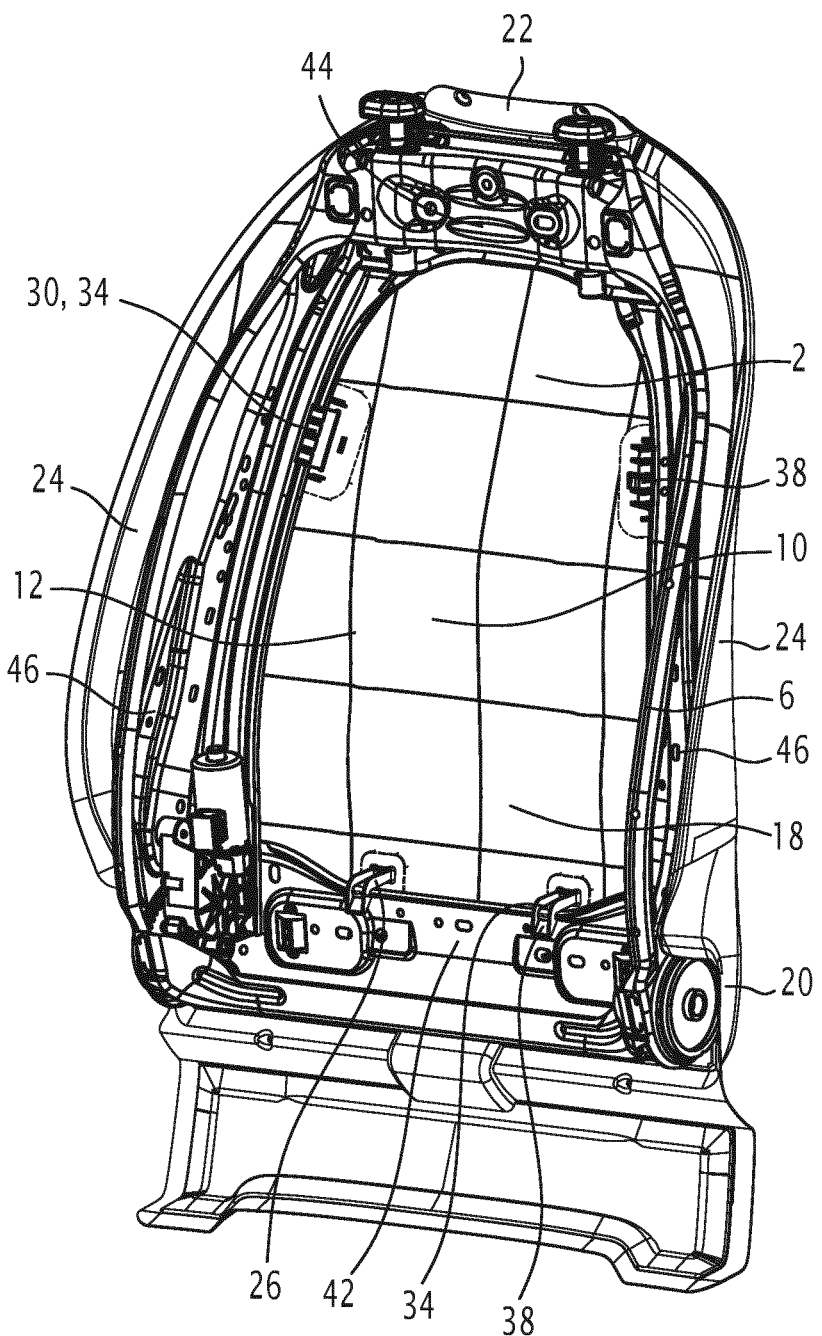
FIG. 2 is a schematic perspective view of a covering element according to an embodiment of the invention mounted on a frame.

With reference to FIGS. 1 and 2, a seat support element 1, for example of a vehicle seat, comprising at least one covering element 2 and a padding 4 mounted on a frame 6 is described.

The support element 1 is for example intended to form a seat backrest, as shown in FIG. 1. Alternatively, the support element 1 could be adapted to form a seat squab. Such a support element 1 comprises an inner surface to form a support surface for an occupant of the seat and an outer surface, opposite the inner surface, and forming a surface which is not intended to form a support surface for an occupant of the seat. According to the embodiment shown in the figures, the exterior surface is a surface at least partially visible from the outside of the seat. In the remainder of the description, the term "inner" refers to what is turned toward the interior surface of the support element 1 and the term "outer" refers to what is turned toward the exterior surface of the support element 1.

The covering element 2 comprises an outer surface 8 that forms at least part of the exterior surface of the support element 1. Thus, as shown in FIG. 1, the outer surface 8 of the covering element 2 for example forms the back of the backrest, opposite the surface intended to accommodate a passenger. Opposite from the outer surface 8, the covering element 2 comprises an inner surface 10, shown in FIG. 2, not visible from the outside of the support element 1.

From the inner surface 10 to the outer surface 8, the covering element 2 comprises at least one foam layer 12, a skin 14 made of synthetic material and a paint layer 16. More particularly, the inner surface 10 of the covering element 2 is formed by the inner surface of the foam layer 12 and the outer surface 8 of the covering element 2 is formed by the outer surface of the paint layer 16, the skin 14 made of synthetic material extending between the outer surface of the foam layer 12 and the inner surface of the paint layer 16.

The foam layer 12, as well as the other layers of the covering element 2, comprises a main portion 18 extending between a lower edge 20 and an upper edge 22 and between two lateral edges 24 joining the lower edge 20 and the upper edge 22 on either side of the main portion 18. In the case of a seat back, the main portion 18 forms the back of the backrest, the lower edge 20 extends on the side and along the squab, the upper edge 22 extends in the vicinity of the headrest and the lateral edges 24 form the sides of the backrest and extend for example between the main portion 18 and the surface for receiving the back of a passenger. In other words, the lateral edges 24 extend in a direction different from that of the main portion 18, for example substantially perpendicular to the main portion 18, as is more particularly visible in FIG. 4.

The foam layer 12 forms a semi-rigid complex on the backside of the skin made of synthetic material 14. The covering element 2 thus has a certain flexibility. The foam layer 12 is for example made of a synthetic material having a formulation containing water. More particularly, the foam layer 12 is for example a layer of cellular foam, that is, a foam layer containing air bubbles. These cells are obtained during the chemical reaction making it possible to obtain the foam layer 12 as will be described later.

The foam layer 12 is for example made of an elastomeric material, for example a material resulting from a polyol-isocyanate reaction using a foaming catalyst. According to one embodiment, the first foam layer 12 is made of a polyurethane foam containing water.

The foam layer 12 has for example a thickness of between 1 mm and 15 mm, preferably between 4 mm and 9 mm. It should be noted that the foam layer 12 can have a variable thickness depending on the desired characteristics, in particular in terms of flexibility, for the padding of the covering element 2. The foam layer 12 has for example a rigidity of between 3N/30 mm and 45N/30 mm, preferably between 3N/30 mm and 25N/30 mm.

The skin made of synthetic material 14 extends over the outer surface of the foam layer 12 and forms a support for the paint layer 16 by adhering thereto. The skin of synthetic material 14 forms for example a substantially rigid or semi-rigid shell.

To this end, the skin made of synthetic material 14 is for example formed from a synthetic material devoid of water. More particularly, the skin made of synthetic material 14 is similar to a non-cellular foam layer, that is, free of cells. In other words, the skin made of synthetic material does not contain air bubbles, which gives it a certain rigidity. It should be noted that the skin made of synthetic material 14 can contain residual air bubbles, the presence of which is due to the method for applying the skin made of synthetic material 14 which will be described later.

The skin made of synthetic material 14 is for example made of an elastomeric material, for example a material resulting from a polyol-isocyanate reaction. According to one embodiment, the skin made of synthetic material 14 is made of substantially non-cellular polyurethane and devoid of water. Thus, the skin made of synthetic material 14 has a similar behavior to a PVC-coated fabric or to a leather textile.

The skin made of synthetic material 14 has for example a thickness of between 0.1 mm and 3 mm, preferably between 0.5 mm and 2 mm. It should be noted that the skin made of synthetic material 14 may have a variable thickness depending on the desired characteristics, in particular in terms of rigidity, for the shell of the support element. The skin made of synthetic material 14 has for example a density of between 400 kg·m$^{-3}$ and 1500 kg·m$^{-3}$, preferably between 800 kg·m$^{-3}$ and 1200 kg·m$^{-3}$. The skin made of synthetic material 14 has for example a tensile strength of between 1 Mpa and 50 Mpa, preferably between 3 Mpa and 15 Mpa, measured according to the DIN EN ISO 527-3/2/100 method. The skin made of synthetic material 14 has for example a tear strength of between 0.5 N·mm$^1$ and 30 N·mm$^1$, preferably greater than 4 N·mm$^1$, preferably greater than 6 N·mm$^1$, measured according to the DIN EN ISO 13937-2 method.

The paint layer 16 makes it possible to impart a particular appearance to the exterior surface of the covering element, in particular by choosing the color and the gloss of the paint layer. The paint layer is for example a water paint or a solvent-based paint. The paint layer 16 has for example a thickness of between 5 μm and 120 μm, preferably between 10 μm and 80 μm, for example approximately 25 μm. It is understood that the paint layer 16 can be formed from several layers of paint and/or varnish, depending on the desired appearance for the exterior surface of the covering element 2 and its properties. Thus, the paint layer 16 may have anti-abrasive properties, resistance to wear, light, chemicals, etc. The paint layer 16 may also have a pattern, such as graining, a logo or the like, this pattern being able to be formed on the paint layer during the production of the covering element 2, as will be described later.

The covering element 2 further comprises at least one fastening element 26, 28, 30 for fastening the covering element 2 to the frame 6, as shown in FIG. 2. More particularly, the covering element 2 comprises at least one fastening element selected from a lower fastening element 26, an upper fastening element 28 and a lateral fastening element 30, these different fastening elements being more particularly shown in FIG. 3.

In general, one or each fastening element 26, 28, 30 comprises at least one reinforcing portion 32 and at least one fastening portion 34. The reinforcing portion 32 extends into the foam layer 12 and is overmolded by the latter and the fastening portion 34 projects out from the inner surface 10 of the foam layer 12 and extends outward therefrom, as is more particularly visible in FIGS. 2 and 4. Each fastening element 26, 28, 30 is for example made of a single piece, that is the fastening portion 34 is integral with the reinforcing portion 32. Each fastening element 26, 28, 30 is for example made of a rigid plastic material.

Figure 3:
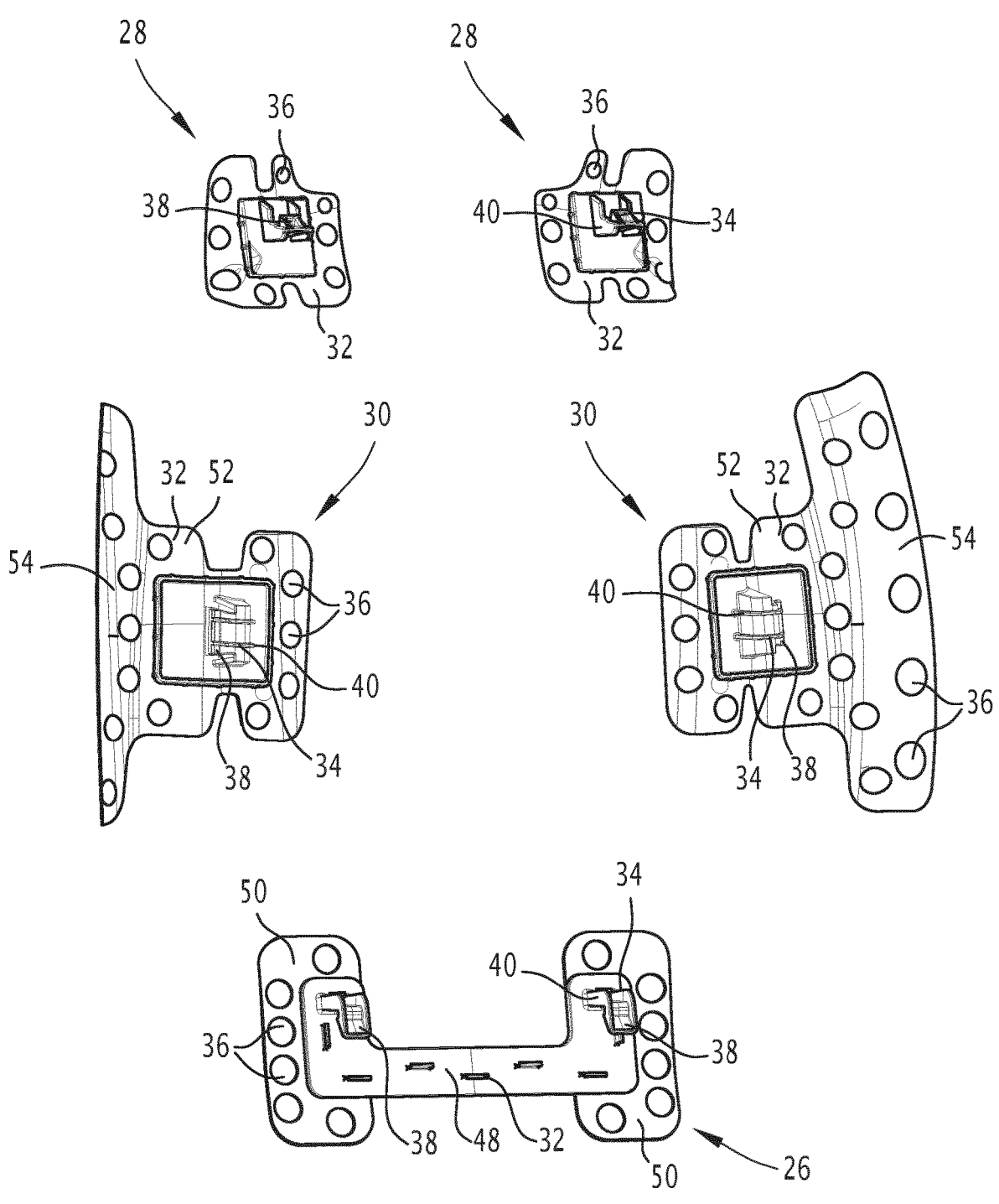
FIG. 3 is a schematic perspective view of the fastening elements integrated into the covering element of FIG. 2.

The reinforcing portion 32 has for example the shape of a plate, not necessarily planar, extending into the thickness of the foam layer 12 and overmolded by the latter, that is to say that the foam layer 12 coats at least part of the reinforcing portion 32, preferably the entire reinforcing portion 32. This overmolding is removed during the production of the covering element 2, as will be described later. In order to improve the anchoring of the reinforcing portion 32, the latter comprises for example at least one opening 36 passing through the reinforcing portion 32 and opening into the two faces thereof so that the foam of the foam layer 12 extends into the opening 36 and passes from one side to the other of the reinforcing portion 32. Preferably and as shown in FIG. 3, the reinforcing portion 32 comprises a plurality of through openings 36 allowing the foam to flow from one side of the reinforcing portion 32 to the other. The reinforcing portion 32 makes it possible to reinforce the part of the covering element 2 wherein it extends, in particular by stiffening this part, as will be described in more detail later. Thus, the shape of the reinforcing portion 32 can be adapted to the zone of the covering element 2 to be reinforced.

The fastening portion 34 projects out from the reinforcing portion 32, for example in a direction substantially perpendicular to the plate forming the reinforcing portion 32 so that the fastening portion 34 exits from the inner surface 10 of the foam layer 12 when the reinforcing portion 32 is overmolded by the foam layer 12. The fastening portion 34 comprises at least one fastening hook 38 extending at a free end of said fastening portion 34 and outside the foam layer 12. More particularly, the fastening portion 34 comprises for example an arm 40 integral with the reinforcing portion 32 and from whose end the fastening hook 38 extends. The arm 40 and/or the fastening hook 38 for example has a certain elasticity allowing the fastening portion 34 to deform elastically during the fastening of the fastening element to the frame 6. As will be described in more detail later, the shape of the fastening hook 38 is adapted to the part of the frame 6 on which the fastening portion 34 is to be attached.

The lower fastening element 26 is arranged to cooperate with a lower cross-member 42 of the frame 6, the upper fastening element 28 is arranged to cooperate with an upper cross-member 44 and the lateral fastening elements 30 are arranged to cooperate with posts 46 of the frame 6. As shown in FIG. 2, the posts 46 join the lower cross-member 42 to the upper cross-member 46 so that the frame 6 has the general shape of a framework.

The lower fastening element 26 is arranged to stiffen a lower part of the main portion 18 of the covering element 2 close to the lower edge 20. To this end, as shown in FIG. 3, the lower fastening element 26 comprises for example a first reinforcing portion 48 extending substantially parallel to and along the lower edge 20 and two second reinforcing portions 50 extending substantially perpendicularly to the first reinforcing portion 48 on either side thereof. The lower fastening element 26 comprises for example two fastening portions 34 that each project from one of the second reinforcing portions 50. When the reinforcing portions 48, 50 of the lower fastening element 26 extend into the foam layer 12 and the covering element 2 is mounted on the frame 6, the first reinforcing portion 48 extends along a part of the lower cross-member 42 and the second reinforcing portions 50 extend along the height of the lower cross-member 42. The fastening hooks 38 of the fastening portions 34 are open toward the lower edge 20 of the foam layer 12 and are fastened to an upper edge of the lower cross-member 42 as shown in FIG. 2.

The upper fastening element 28 comprises a reinforcing portion 32 extending in the vicinity of the upper edge 22 of the foam layer 2 and for example in the vicinity of a lateral edge of the foam layer. A fastening portion 34 protrudes from the reinforcing portion 32 and the fastening hook 38 is in the form of a fastening clip arranged to cooperate with a corresponding orifice provided in the upper cross-member 44 when the covering element 2 is mounted on the frame 6.

According to the embodiment shown in FIG. 3, two upper fastening elements 28 are provided, each in the vicinity of one of the lateral edges of the foam layer. Alternatively, the upper fastening element 28 extends substantially parallel and along the latter in a central part of the upper edge so as to stiffen an upper part of the main portion 18 of the covering element 2 close to the upper edge 22. The upper fastening element 28 comprises a plurality of fastening portions 34, for example three fastening portions 34, that projects out of the reinforcing portion 32 and distributed along the latter. The fastening hooks 38 of the fastening portions 34 are in the form of fastening clips arranged to cooperate with corresponding orifices provided in the upper cross-member 44 when the covering element 2 is mounted on the frame 6.

Figure 4:
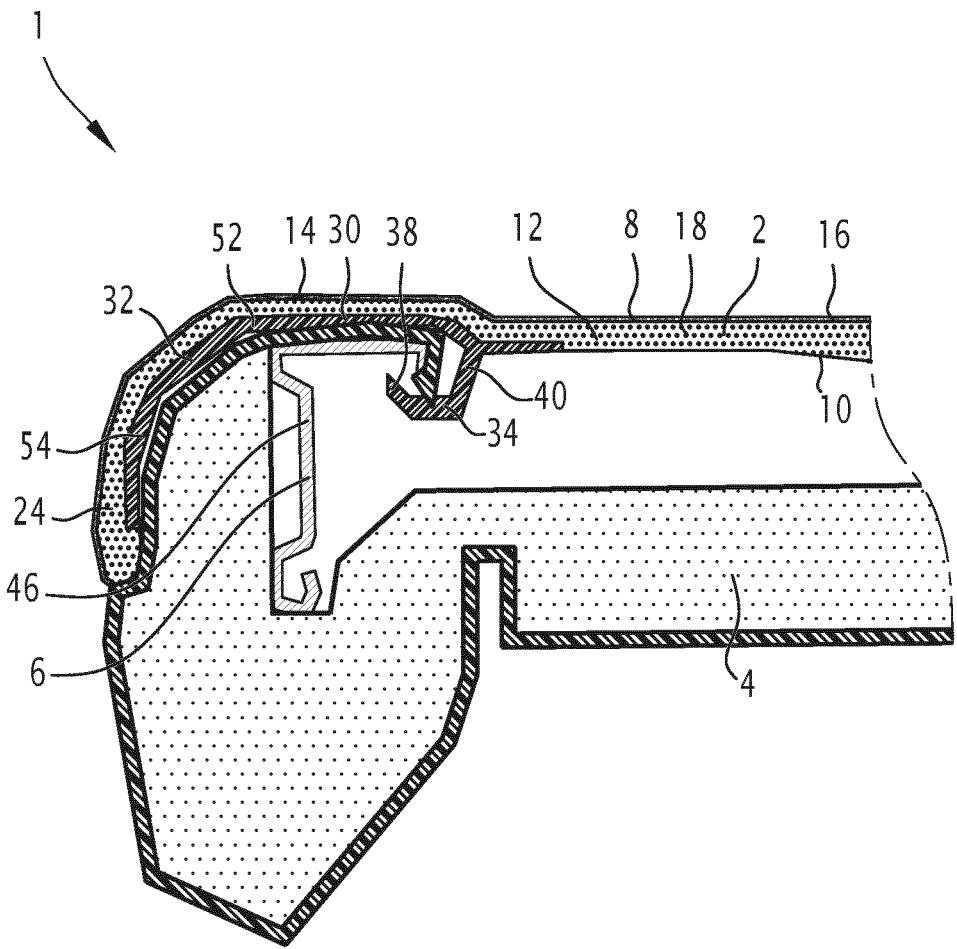
FIG. 4 is a schematic perspective view of part of a support element showing the fastening of the covering element onto a frame.
Figure 5:
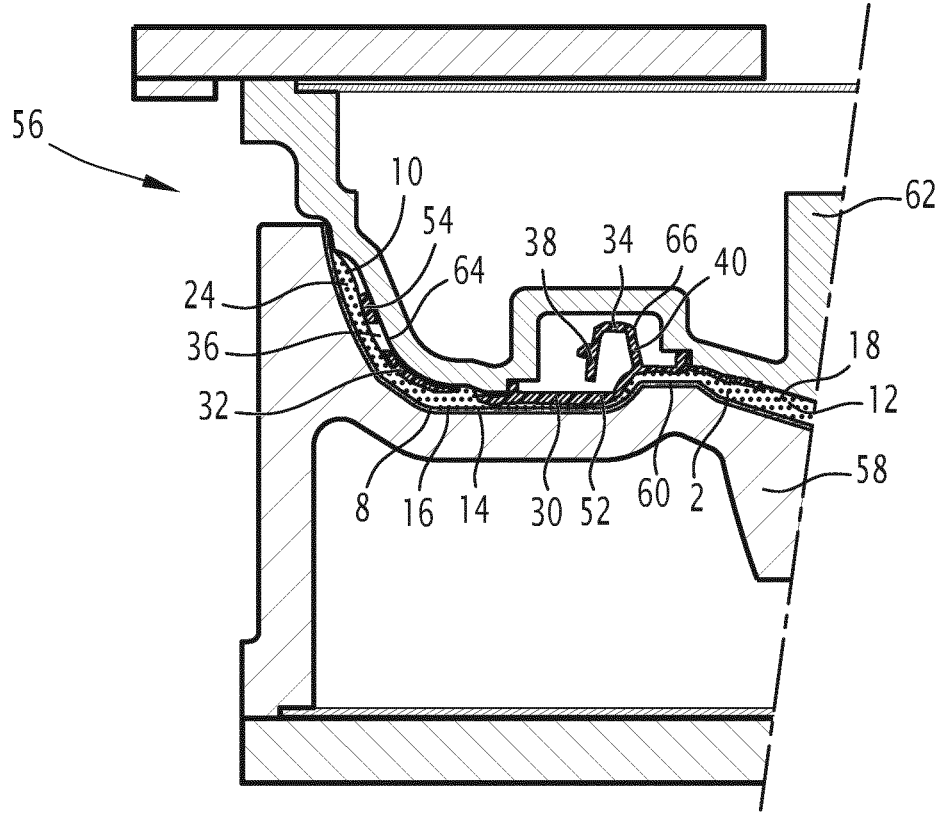
FIG. 5 is a schematic sectional view of a part of the covering element during a step of the method for producing this covering element.

Each lateral fastening element 30 is arranged to stiffen a part of one of the lateral edges 24 of the foam layer 12. To this end, each lateral fastening element 30 comprises a first reinforcing portion 52 extending into the main portion 18 of the foam layer 12 in the vicinity of a lateral edge 24 and a second reinforcing portion 54 integral with the first reinforcing portion 52 and extending into the lateral edge 24, as is more particularly visible in FIG. 4. Thus, the second reinforcing portion 54 forms a non-zero angle with the first reinforcing portion 52. The fastening portion 34 projects out from the first reinforcing portion 52 and the fastening hook 38 is open toward the second reinforcing portion 54. Thus, when the first and second reinforcing portions 52, 54 extend into the foam layer 12 and the covering element 2 is mounted on the frame 6, the first and second reinforcing portions 52, 54 extend facing two walls of the upright and the fastening hook 38 is attached on the inner side of the frame formed by the frame 6 on the upright 46, as shown in FIG. 4. As shown in FIGS. 4 and 5, the zone of the first reinforcing portion 52 from which the fastening portion 34 extends is, for example, covered with foam only on one side of the outer face of this first reinforcing portion 52, the inner face being left visible on the side of the inner surface 10 of the foam layer 12.

As indicated above, the covering element 2 is fastened to the frame 6 by at least one of the fastening elements 26, 28, 30 described above. Preferably, the covering element 2 is fastened to the frame 6 by several fastening elements, for example at least by two lateral fastening elements 30 on the two uprights 46 of the frame 6. Particularly advantageously, the covering element 2 is fastened to the lower cross-member 42, to the upper cross-member 44 and to the uprights 46 respectively by a lower fastening element 26, one or two upper fastening elements 28 and two lateral fastening elements 30, as shown in FIG. 2. Such a fastening makes it possible to ensure robust holding and correct positioning of the covering element 2 on the frame 6. It is understood that more than one fastening element can be provided by edge of the foam layer, for example in order to increase the rigidity of these edges. The mounting of the covering element 2 on the frame is done simply by placing the covering element 2 on the frame 6 and by fixing each of the fastening elements to the part of the corresponding frame. This fastening operation is facilitated by the stiffening of the part (s) of the covering element reinforced by the reinforcing portion (s) 32 of the corresponding fastening elements. Indeed, such stiffening facilitates the handling of the covering element 2 and makes it possible to exert a certain force thereon to allow the fastening of the fastening hooks 38 on the frame 6.

A covering element as described above has a satisfactory appearance on the side of its outer surface and can be fixed simply and robust on a frame 6 of a seat support element.

The method for producing such a support element will now be described with reference to FIG. 5.

The covering element 2 is made in an embodiment tool 56 shown in part in FIG. 5, making it possible to obtain a finished support element at the outlet of the production tool 56.

The production tool 56 comprises a first part 58 defining a first surface 60 having the shape of the outer surface 8 of the covering element 2 to be made and a second part 62 defining a second surface 64 having the shape of the inner surface 10 of the covering element to be made.

In this respect, the shape of the first and second surfaces 60, 64 shown in FIG. 5 is only given by way of example and other shapes can be envisaged. Furthermore, the first surface 60 may be arranged to apply a particular aspect on the outer surface 8 of the covering element 2, for example by having a graining and/or a localized pattern, such as a logo or the like, extending protruding or recessed on the first surface 60.

The various steps of the method described below can be carried out while the production tool 56 is heated, in particular the first surface 60, for example at a temperature close to 70° C.

At least one paint layer is applied to the first surface 60 so that the paint layer adopts the shape of the first surface 60. The paint layer is applied for example by spraying. When several layers of paint and/or varnish are provided, they are applied successively on the first surface 60 from the exterior toward the interior, that is to say that the layer forming the outer surface 8, for example a layer of varnish, is applied first on the first surface 60 and then that the layer immediately extending against this first layer, for example a paint layer defining the color of the outer surface, is applied against the first layer lining the first surface 60. Heating the first surface 60 makes it possible to obtain rapid drying of the paint layer.

According to one embodiment, a molding agent is first applied to the first surface 60 before the paint layer and the layer (s) of paint and/or varnish are applied to the demolding agent lining the first surface 60. Such a molding agent is for example applied by spraying on the first surface 60 and makes it possible to facilitate the removal of the support element 1 made from the production tool 56, as will be described later.

The skin made of synthetic material 14 is then applied against the inner surface of the paint layer. The skin made of synthetic material 14 is applied, for example by spraying the water-free material forming the skin made of synthetic material 14 against the inner surface of the paint layer, for example while the latter is not yet dry in order to ensure the adhesion between the skin of synthetic material 14 and the paint layer. The material of the skin made of synthetic material 14 is kept in the viscous state after its application and before the application of the foam layer 12, for example due to the heating of the first part 58 of the production tool 56.

The foam layer 12 is produced by injection into a molding cavity defined between the first surface 60 of the first part 58 and the second surface 64 of the second part 62, the molding cavity having the shape of the foam layer to be produced.

Prior to this injection, one or more fastening elements 26, 28, 30 are placed in the molding cavity so that their reinforcing portion(s) 32 is overmolded by the foam layer 12 during the production thereof. To do this, the fastening element(s) 26, 28, 30 are for example fastened to the second part 62 of the production tool 56, the reinforcing portion(s) extending into the molding cavity and leaving the fastening portion 34 of this or these fastening elements 26, 28, 30 outside the molding cavity. Thus, for a lateral fastening element 30, as shown in FIG. 5, the fastening portion 34 is for example placed in a housing 66 of the second recessed part 62 of the second surface 62. This recess 66 is hermetically closed by the zone of the first reinforcing portion 52 from which the fastening portion 34 extends. Thus, when the foam is injected into the molding cavity, it does not flow into the recess 66.

When the fastening element (s) 26, 28, 30 have been fastened to the second part 62, the production tool 56 is closed to form the molding cavity by bringing the second part 62 closer to the first part 58, as shown in FIG. 5.

A foam precursor material having a formulation containing water is injected into the molding cavity to form the foam layer 12 by chemical reaction, in particular by means of a foaming catalyst, as described above. The chemical reaction creates a cellular foam in the molding cavity on the surface 5 internal of the skin made of synthetic material 14, this foam covering the reinforcing portion(s) 32 of the fastening element(s) 26, 28, 30, in particular by flowing into the through openings 36 provided in this or these reinforcing portions 32. This injection is while the skin made of synthetic material 14 is in the viscous state, it is ensured that it adheres with the foam layer 12, also in the viscous state.

The method for producing the support element 1 described above makes it possible to obtain a finished covering element 2 having a satisfactory appearance and feel in one operating cycle of the production tool 56. This covering element 2 incorporates the fastening element(s) 26, 28, 30 necessary for mounting the covering element on the frame 6, as described above.

The invention claimed is:

1. A covering element of a seat support element intended to be fastened to a frame of said support element, said covering element comprising an inner surface intended to be facing said frame and an outer surface, opposite the inner surface and intended to be facing outwardly of the support element, the covering element comprising, from the inner surface to the outer surface, at least one foam layer, a skin made of synthetic material and a paint layer, wherein the covering element further comprises at least one fastening element for fastening the covering element to the frame, said fastening element comprising at least one reinforcing portion extending into the foam layer and overmolded by said foam layer and at least one fastening portion extending from the inner surface of said foam layer.

2. The covering element according to claim 1, wherein the fastening element is made from a single piece, the fastening portion that projects out of the reinforcing portion and comprising at least one fastening hook extending at a free end of said fastening portion and outside the foam layer.

3. The covering element according to claim 1, wherein the foam layer comprises a main portion bounded by a lower edge and an upper edge and by two lateral edges joining the lower edge and the upper edge, at least one fastening element extending in the vicinity of one of the lower, upper or lateral edges, the reinforcing portion stiffening a part of said edge and the fastening portion being arranged to fasten said edge to a frame of a seat support element.

4. The covering element according to claim 3, comprising a plurality of fastening elements each extending in the vicinity of a different edge of the foam layer.

5. The covering element according to claim 3, wherein each lateral edge of the foam layer extends in a direction different from the main portion, a lateral fastening element extending in the vicinity of one of the lateral edges comprising a first reinforcing portion extending into the main portion of the foam layer and a second reinforcing portion extending from the first reinforcing portion into the lateral edge of the foam layer, the fastening portion of the lateral fastening element projecting out from the first reinforcing portion.

6. The covering element according to claim 3, wherein a lower fastening element extending in the vicinity of the lower edge comprises a first reinforcing portion extending along a portion of the lower edge parallel to said lower edge and two second reinforcing portions extending on either side of the first reinforcing portion perpendicular to said first reinforcing portion, a fastening portion projecting out from each second reinforcing portion.

7. The covering element of claim 3, wherein an upper fastening element extending in the vicinity of the upper edge comprises a reinforcing portion extending along a part of said upper edge and a plurality of fastening portions projecting out from said reinforcing portion.

8. The covering element according to claim 1, wherein the reinforcing portion of the fastening element comprises at least one opening passing through said reinforcing portion, the foam of the foam layer extending into said opening and on either side of said reinforcing portion.

9. A seat support element comprising a frame, comprising a lower cross-member and an upper cross-member fastened to each other by two lateral posts, and the covering element according to claim 1, said covering element being fastened to at least one of the lower and upper beams and/or to at least one of the lateral posts by the fastening portion of at least one fastening element.

10. A method for producing a covering element according to claim 1—said method comprising the following steps:
   applying at least one paint layer against a first surface of a molding cavity of a production tool, said first surface having the shape of the outer surface of the covering element to be made,
   applying a skin made of synthetic material against the inner surface of the paint layer,
   forming a molding cavity between the first surface and a second surface of the molding cavity, said second surface having the shape of the inner surface of the covering element to be made, at least one fastening element being placed in the production tool so that the reinforcing portion of said fastening element extends into the molding cavity and the fastening portion of said fastening element extends outside said molding cavity,
   injecting a foam precursor material into said molding cavity so as to form a foam layer on the inner surface of the skin made of synthetic material, said foam layer overmolding the reinforcing portion of the fastening element.

11. The production method according to claim 10, wherein the skin made of synthetic material is made of a synthetic material free of water and the foam precursor material has a formulation containing water and a foaming catalyst at the time of its injection into the molding cavity.

* * * * *